(12) United States Patent
Kondo et al.

(10) Patent No.: US 8,086,340 B2
(45) Date of Patent: Dec. 27, 2011

(54) HUB POSTURE DETECTION METHOD AND APPARATUS

(75) Inventors: Toshiyuki Kondo, Hagagun (JP); Takao Shibayama, Hagagun (JP)

(73) Assignee: Honda Motor Co., Ltd., Tokyo (JP)

( * ) Notice: Subject to any disclaimer, the term of this patent is extended or adjusted under 35 U.S.C. 154(b) by 461 days.

(21) Appl. No.: 12/410,886

(22) Filed: Mar. 25, 2009

(65) Prior Publication Data

US 2009/0248191 A1    Oct. 1, 2009

(30) Foreign Application Priority Data

Mar. 27, 2008    (JP) ................................ 2008-084965

(51) Int. Cl.
*G06F 19/00* (2011.01)
(52) U.S. Cl. ......... 700/114; 29/525.02; 29/894; 33/203; 81/57.37; 700/95; 700/117
(58) Field of Classification Search .................. 700/114; 301/35.621, 35.629; 29/894; 33/203
See application file for complete search history.

(56) References Cited

U.S. PATENT DOCUMENTS

| | | | | |
|---|---|---|---|---|
| 5,125,298 A | * | 6/1992 | Smith | 81/57.37 |
| 5,640,750 A | * | 6/1997 | Yoshida et al. | 29/525.02 |
| 6,836,970 B2 | * | 1/2005 | Hirano | 33/203 |
| 2006/0288577 A1 | * | 12/2006 | Bormuth | 29/894 |
| 2011/0087360 A1 | * | 4/2011 | Chen et al. | 700/114 |

FOREIGN PATENT DOCUMENTS

JP    06-190661 A    7/1994

* cited by examiner

*Primary Examiner* — Dave Robertson
(74) *Attorney, Agent, or Firm* — Arent Fox LLP

(57) ABSTRACT

Distance meters measure distances from a reference position to a first area including an upper pitch circle portion and a second area including a lower pitch circle portion. Center coordinates of the hub is calculated based on respective center coordinates of two hub bolts included within the first and second areas. Coordinates of three points defining apexes of a triangle are acquired. Inclination angle of the hub relative to a vertical plane is calculated based on the coordinates of the three points, and an orientation of each of the hub bolts is calculated based on the center coordinates of the hub and the center coordinates of the hub bolt.

2 Claims, 10 Drawing Sheets

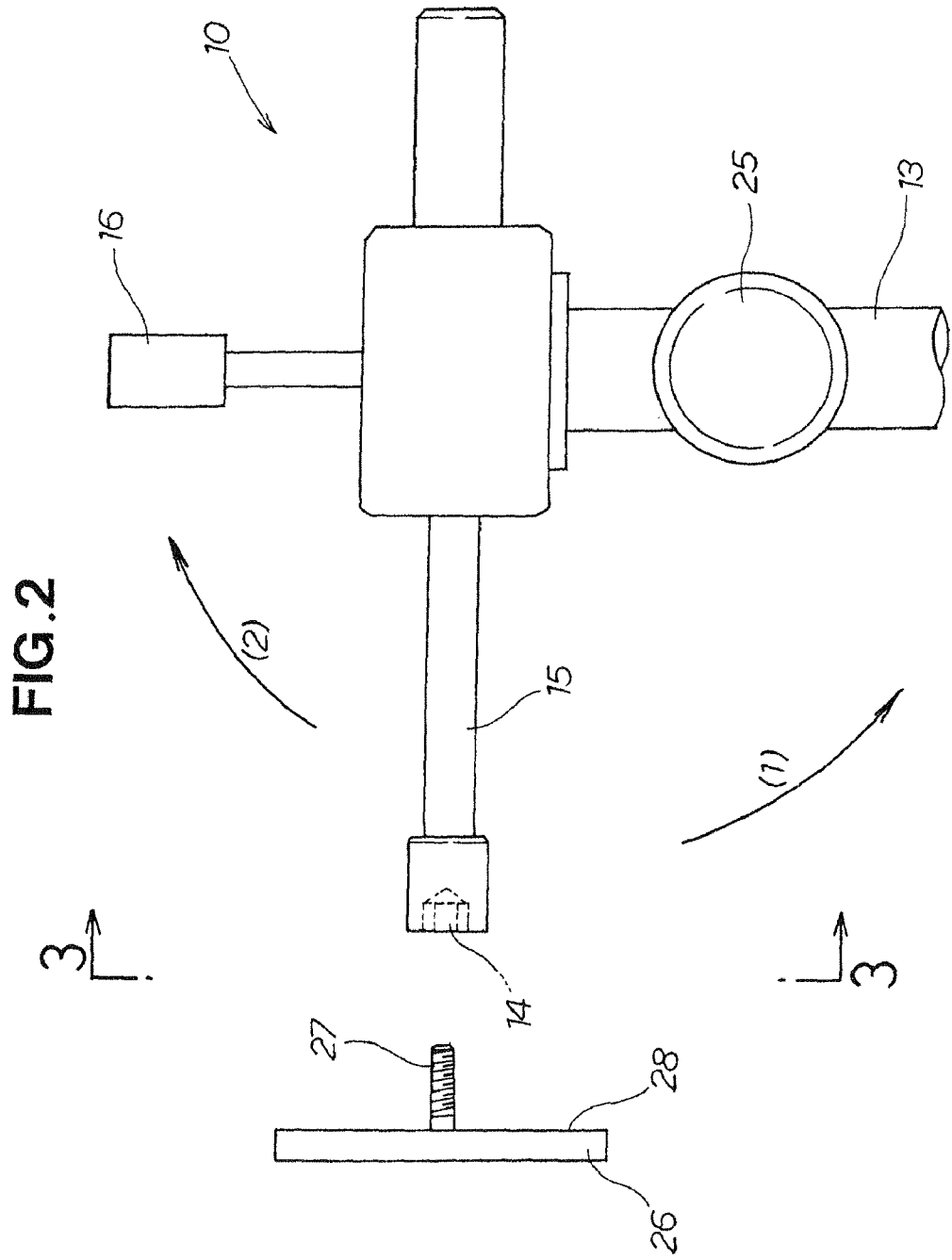

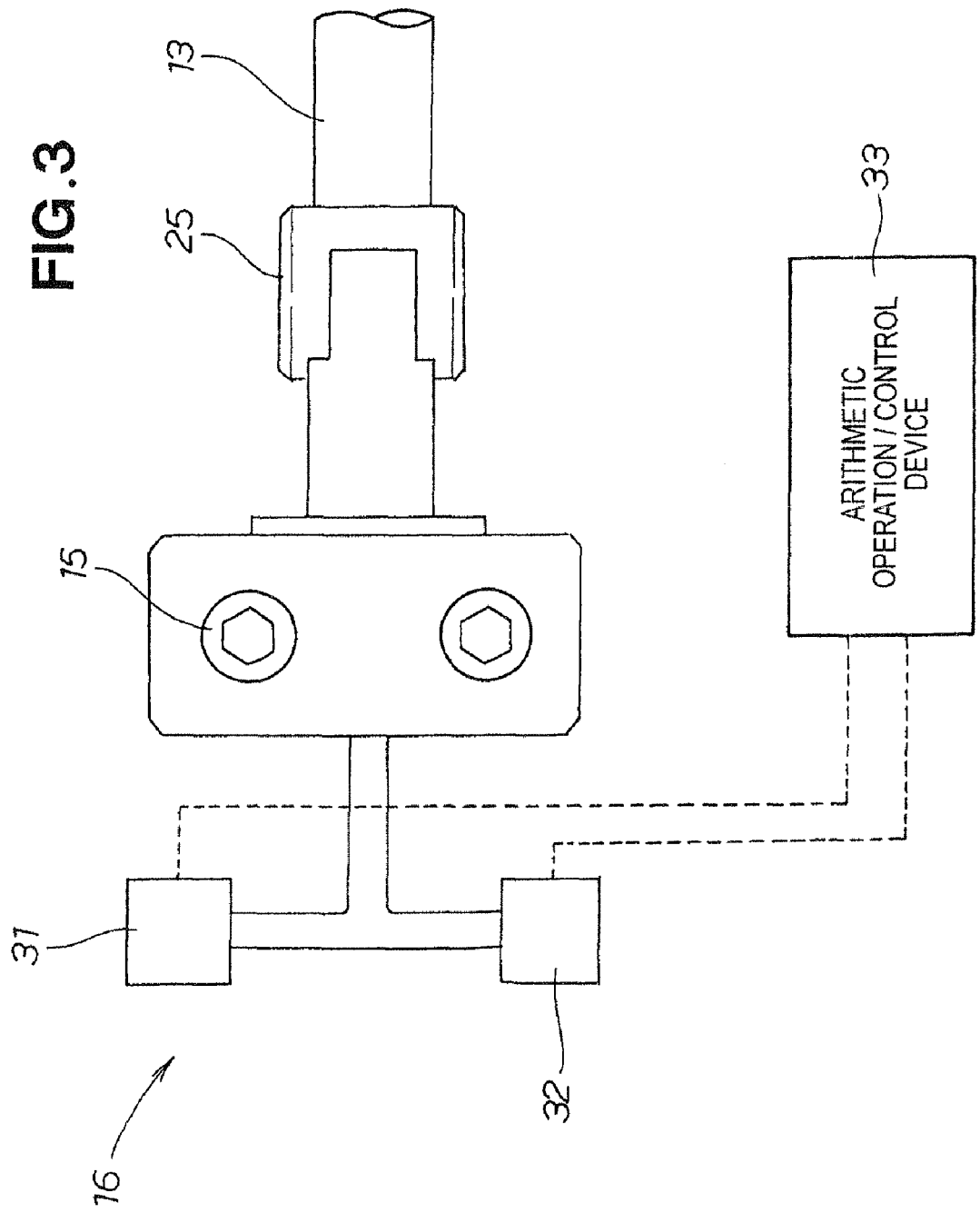

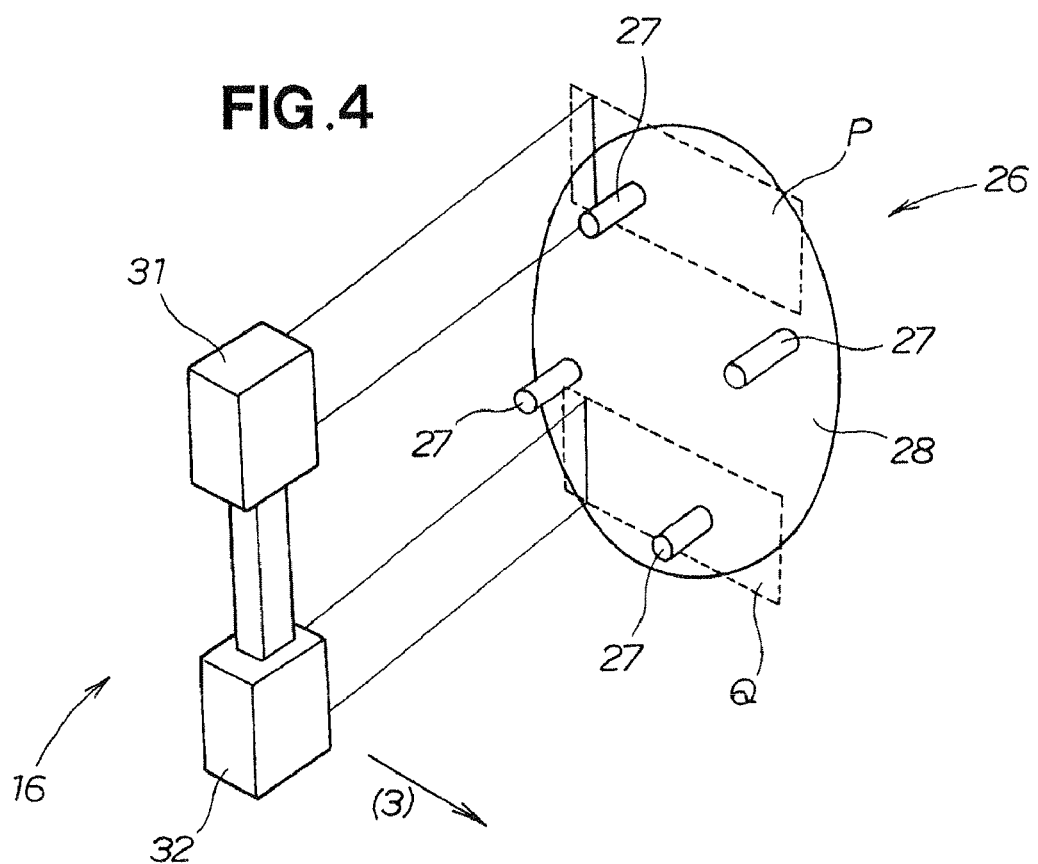

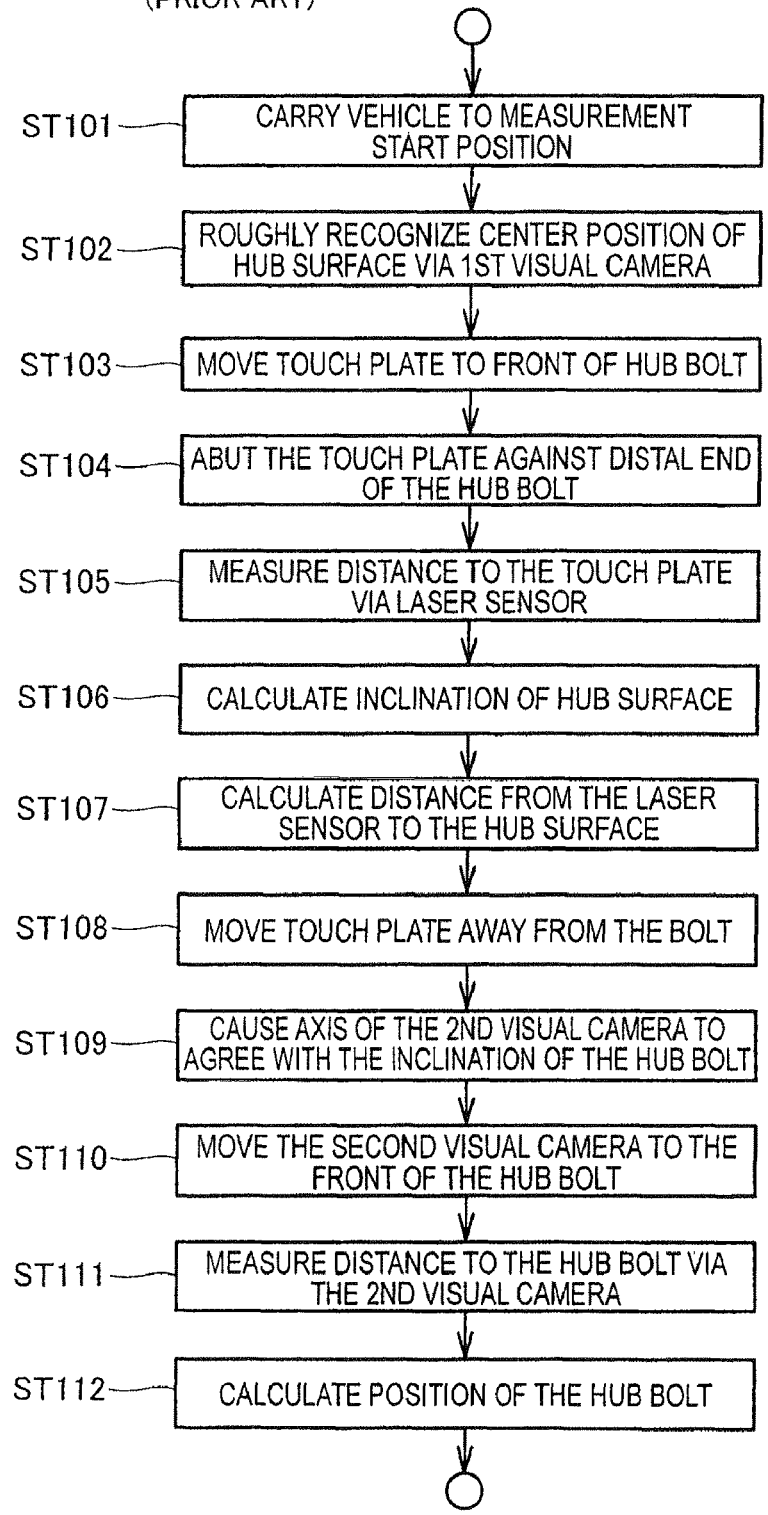

HUB POSTURE DETECTION METHOD AND APPARATUS

FIELD OF THE INVENTION

The present invention relates to a technique for detecting an inclination and center of a hub and orientations of hub bolts of a vehicle at the time of mounting a wheel on the hub.

BACKGROUND OF THE INVENTION

In assembly of mass-produced vehicles, a technique for automatically mounting a wheel on a vehicular hub has been in practical use, one example of which is disclosed in Japanese Patent Application Laid-Open Publication No. HEI-06-190661.

FIG. 13 hereof is a view explanatory of a fundamental construction of a wheel mounting apparatus disclosed in the HEI-06-190661 publication. The wheel mounting apparatus 101 includes a robot 102, a first visual camera 103, a second visual camera 104, a laser sensor 105, a nut runner 106, a wheel clamp 107, a cylinder 108, a ball joint 109 connected to the cylinder 108, and a touch plate 110 connected to the ball joint 109. Reference numeral 111 indicates a wheel, 112 a hub, 113 hub bolt, and 114 a nut.

FIG. 14 hereof is an operational flow chart explanatory of the basic principles of the technique disclosed in the HEI-06-190661 publication. First, at step ST101, a vehicle is carried in to a measurement start position, so that predetermined measurement is started. At step ST102, the first visual camera 103 is moved by the robot 102 to the front of the hub 112, so that a center position of the surface of the hub is roughly recognized via the first visual camera 103. Then, at step ST103, the robot 102 is driven, on the basis of the recognized center position, to move the touch plate 110 to the front of the hub 113. At next step ST104, the cylinder 108 is activated to advance the touch plate 110 into abutment against the distal end of the hub bolt 113, so that the touch plate 110 is inclined, via the ball joint 109, to lie parallel to the hub surface. Then, a distance to the touch plate 110 is measured via the laser sensor 105 at step S105.

Then, on the basis of the measured distance, an inclination of the hub surface is calculated at step S106, and a distance from the laser sensor 105 to the hub surface is calculated at step ST107. After that, the touch plate 110 is moved away from the front of the hub 112, at step ST108. Then, the axis of the second visual camera 104 is adjusted, via the robot 102, to agree with the inclination of the hub surface at step ST109, and the second visual camera 104 is moved, via the robot 102, to the front of the hub bolt 113 at step ST110. Then, a distance to the hub bolt 113 is measured via the second visual camera 104 at step ST111, and a position of the hub bolt 113 is calculated on the basis of the measured distance at step ST112.

However, the apparatus disclosed in the HEI-06-190661 publication has the following disadvantages. First, because the touch plate 110 is necessary, the apparatus is complicated in construction. Second, because the touch plate 110 is abutted against the hub surface and detected via the laser sensor 105, the detecting accuracy of the hub 112 would be lowered as compared to cases where the hub surface is detected directly via the laser sensor 105. Third, with the disclosed apparatus, where the first and second visual cameras are employed, processing of images taken by these cameras would take a long time, which results in a poor wheel mounting efficiency and hence a poor productivity of vehicles. Thus, there has been a demand for an improved wheel mounting apparatus, especially a more sophisticated hub posture detection technique which can avoid the aforementioned prior art disadvantages.

SUMMARY OF THE INVENTION

In view of the foregoing prior art problems, it is an object of the present invention to provide an improved hub posture detection technique which only requires an apparatus of a simple construction, and which can detect a hub posture with an enhanced detecting accuracy and thereby achieve an enhanced productivity.

In order to accomplish the above-mentioned object, the present invention provides an improved hub posture detection method for, prior to mounting of a wheel on a hub of a vehicle conveyed along a vehicle conveyance line, detecting an inclination and center of the hub and orientations of hub bolts, which comprises the steps of: imaginarily diving a front surface of the hub into four equal parts, by use of perpendicularly-intersecting lines, to divide a pitch circle of the hub bolts into upper and lower and left and right divided pitch circle portions and specify a first horizontally-elongated rectangular area including the upper divided pitch circle portion and a second horizontally-elongated rectangular area including the lower divided pitch circle portion; measuring distances from a reference position to the first and second horizontally-elongated rectangular areas; calculating, on the basis of the distances measured by the measuring step, coordinates of respective centers of two of the hub bolts included within the first and second horizontally-elongated rectangular areas; calculating center coordinates of the hub on the basis of the coordinates of the centers of the two hub bolts; acquiring, from portions of the first and second horizontally-elongated rectangular areas where no hub bolt is included, coordinates of three points that define apexes of an imaginary triangle; calculating, on the basis of the coordinates of the three points, an inclination angle of the hub relative to a vertical plane extending along the vehicle conveyance line; and calculating an orientation of each of the hub bolts on the basis of the center coordinates of the hub and the coordinates of the center of the hub bolt.

According to the hub posture detecting method of the present invention, distances from the reference position to the first and second horizontally-elongated rectangular areas of the hub surface are measured by distance meters, and then, center coordinates of the hub bolts and hub, an inclination angle of the hub and orientations of the hub bolts are calculated. In this way, the method of the present invention can achieve an enhanced hub posture detecting accuracy. Namely, the method of the present invention uses distance meters, such as laser sensors, in place of cameras that present the problem that processing images taken by the cameras tends to be time consuming.

According to another aspect of the present invention, there is provided an improved hub posture detection apparatus for, prior to mounting of a wheel on a hub of a vehicle conveyed along a vehicle conveyance line, detecting an inclination and center of the hub and orientations of hub bolts, which comprises: a control device that imaginarily divides a front surface of the hub into four equal parts, by use of perpendicularly-intersecting lines, to divide a pitch circle of the hub bolts into upper and lower and left and right divided pitch circle portions and specify a first horizontally-elongated rectangular area including the upper divided pitch circle portion and a second horizontally-elongated rectangular area including the lower divided pitch circle portion; and first and second distance meters, the first distance meter measuring a distance from a predetermined reference position to the first horizontally-elongated rectangular area, the second distance meter for measuring a distance from the predetermined reference position to the second horizontally-elongated rectangular area. The control device is adapted to: calculate, on the basis of the distances measured by the first and second distance meters, coordinates of respective centers of two of the hub bolts included within the first and second horizontally-elongated rectangular areas; calculate center coordinates of the hub on the basis of the coordinates of the centers of the two hub bolts; acquire, from portions of the first and second horizontally-elongated rectangular areas where no hub bolt is included, coordinates of three points that define apexes of an imaginary triangle; calculate, on the basis of the coordinates of the three points, an inclination angle of the hub relative to a vertical plane extending along the vehicle conveyance line; and calculate an orientation of each of the hub bolts on the basis of the center coordinates of the hub and the coordinates of the center of the hub bolt.

According to the hub posture detecting apparatus of the present invention, which comprises the two distance meters for measuring distances to the first and second horizontally-elongated rectangular areas and the control device. Thus, the hub posture detecting apparatus can be simple in construction. In addition, because distances to only two areas, i.e. only the first and second horizontally-elongated rectangular areas, of the hub surface have to be measured, the present invention can reduce the number of necessary distance information processing steps and thus achieve an enhanced wheel-mounting efficacy and productivity.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which:

FIG. 2 is a view showing in enlarged scale principal sections shown in FIG. 1;

FIG. 3 is a sectional view taken along line 3-3 of FIG. 2;

FIG. 4 is a view explanatory of how to measure, via first and second distance meters, distances to horizontally-elongated rectangular areas and of a hub surface;

FIG. 14 is an operational flow chart explanatory of basic principles of the conventionally-known apparatus.

DETAILED DESCRIPTION OF THE PREFERRED EMBODIMENTS

Figure 1:
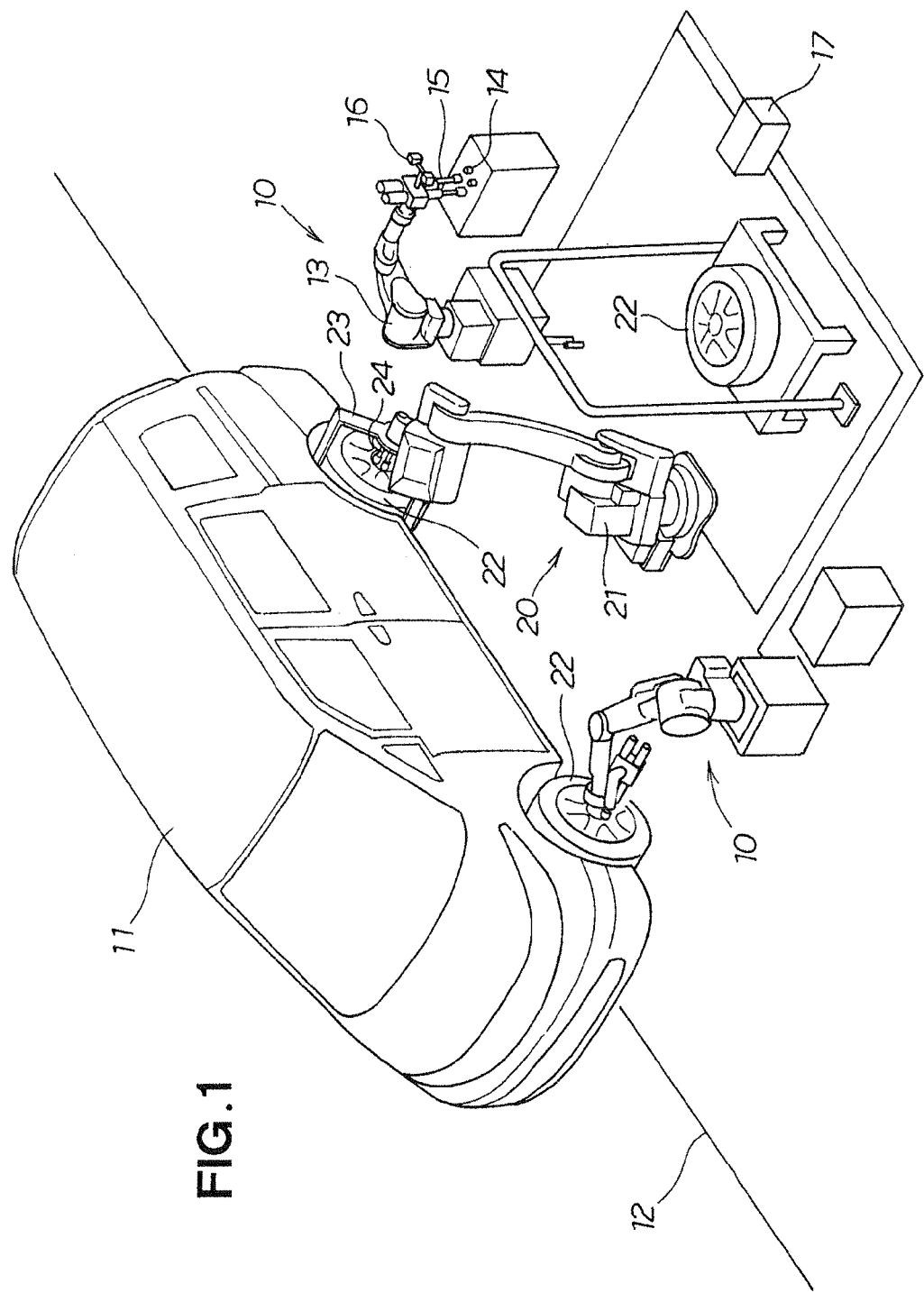
FIG. 1 is a diagram showing a general setup of an embodiment of a hub posture detection apparatus of the present invention.

Reference is now made to FIG. 1 diagrammatically showing a general setup of an embodiment of a hub posture detection apparatus 10 of the present invention. The hub posture detection apparatus 10 includes a robot 13 provided for movement along a vehicle conveyance line 12 for conveying a vehicle 11, a nut runner 15 provided on a distal end portion of the robotb 13 for tightening a nut 14, a measurement section 16 provided on the distal end portion of the robotb 13 for measuring distances to a hub surface 28, and a robot control section 17 for controlling behavior of the robot 13.

Once the hub posture detection apparatus 10 detects a posture of the hub (i.e., inclination and center of the hub and orientations of hub bolts), a wheel supply apparatus 20 mounts a wheel 22 on the hub and the nut runner 24 tightens the nut on the basis the detected hub posture. In this way, the wheel can be fixed to the hub.

The wheel supply apparatus 20 includes, for example, a robot 21, a clamp 23 provided on a distal end portion of the robot 21 for clamping the wheel 22, and a nut runner 24 for temporarily tightening the nut 14. Whereas the robot 21 has been described as controlled by the robot control section 17, another robot control section dedicated to the robot 21 may be provided, in which case the other robot control section is provided as a component part of the wheel supply apparatus 20.

FIG. 2 is a view showing in enlarged scale principal sections shown in FIG. 1. The nut runner 15 is provided on the distal end portion of the robotb 13 via a joint 25, and the measurement section 16 is located generally at right angles to the axis of the nut runner 15.

When the nut 14 is to be tightened onto a hub bolt 27, the joint 25 is moved so that the nut runner 15 faces the hub bolt 27. When distances to the hub surface 28 are to be measured, the joint 25 is moved as indicated by arrow (1) so that the measurement section 16 faces the hub surface 28. Then, by moving the joint 25 as indicated by arrow (2), the nut runner 15 can be brought back to the position facing the hub bolt 27.

FIG. 3 is a sectional view taken along the 3-3 line of FIG. 2. The measurement section 16 includes first and second distance meters 31 and 32 each for measuring a distance to the hub surface 28, and an arithmetic operation/control device 33 for, on the basis of measured distance information output from the distance meters 31 and 32, calculating coordinates of the respective centers of the hub bolts 27, center coordinates of the hub 26, inclination angle of the hub 26 relative to a vertical plane extending along the vehicle conveyance line 12 and orientations of the hub bolts 27.

The following paragraphs describe how the hub posture detection apparatus 10 arranged in the aforementioned manner detects an inclination and center of the hub and orientations of the hub bolts of the vehicle.

FIG. 4 is a view explanatory of how to measure distances to horizontally-elongated rectangular areas (i.e., first and second rectangular areas) P and Q (each indicated by dotted line) of the hub surface 28. First, the measurement section 16 is caused to face the hub 26. Then, the measurement section 16 is moved as indicated by arrow (3) at a speed of 100 mm per second, during which time the first distance meter 31 measures a distance to the area P while the second distance meter 32 measures a distance to the area Q.

Preferably, the distance meters 31 and 32 are each in the form of a laser sensor because laser light has an excellent linear traveling characteristic and is well resistance to external disturbance. However, the distance meters 31 and 32 may be of any desired type, such as a non-contact type distance meter using infrared rays, millimeter waves or ultrasonic waves.

Figure 5A:
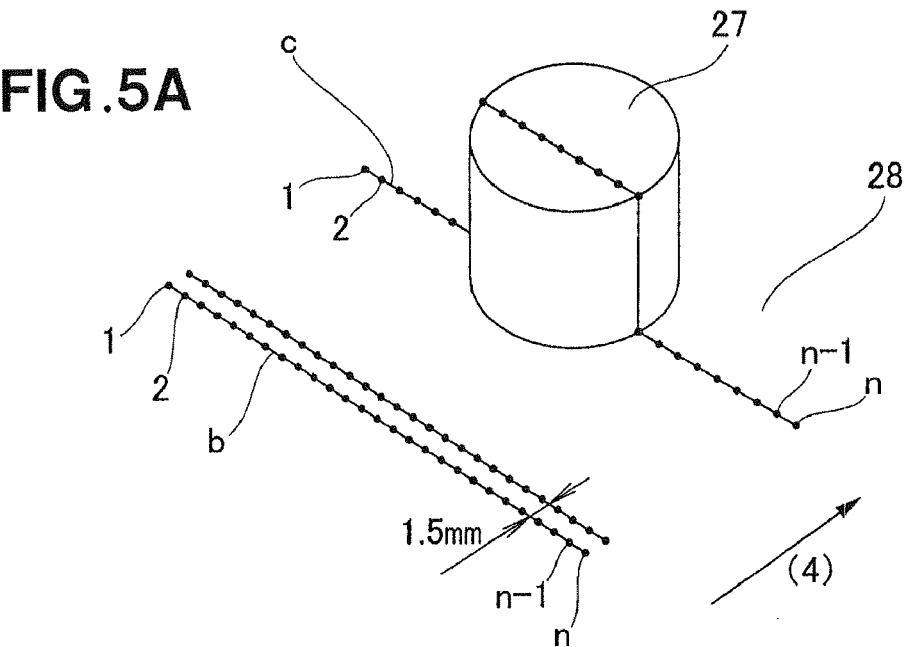
FIGS. 5A-5C are views explanatory of how to convert each measure point into coordinates.
Figure 5B:
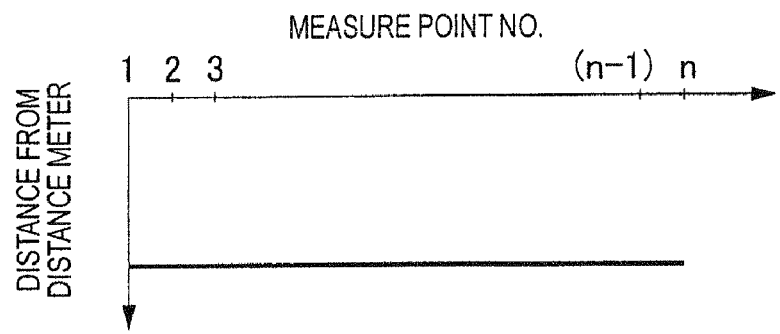
Figure 5C:
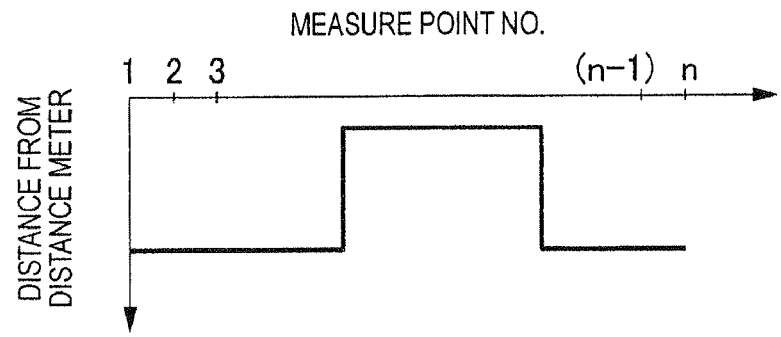

FIGS. 5A-5C are views explanatory of how to convert each predetermined measure point into coordinates. As shown in FIG. 5A, each of the distance meters 31 and 32 repeats operations of measuring a distance to each of a multiplicity of measure points 1, 2, . . . , n−1, n on a measure line b and then moving to a next measure line to measure a distance to each of a plurality of measure points on the next measure line. For example, each of the measure lines has eight hundred (800) measure points, and it takes 15 msec to measure each one of the measure lines. Further, an interval between every two adjoining ones of the measure lines is, for example, 1.5 mm.

FIG. 5B is a graph showing measured distances from the distance meter 31 or 32 to the individual measure points on the measure line b. Measure point numbers 1, 2, . . . , n−1, n on the horizontal axis shown in FIG. 5B correspond to the measure point numbers shown in FIG. 5A. From the graph of FIG. 5B, it can be seen that, on the measure line b, the distances from the distance meter 31 or 32 to the individual measure points 1-$n$ are identical to one another.

FIG. 5C is a graph showing measured distances from the distance meter 31 or 32 to the individual measure points on the measure line c, from which it can be seen that, on the measure line c, smaller distances are measured at several measure points located on the hub bolt 27.

If respective positions (i.e., coordinates) of the first and second distance meters are known, and if distances from the distance meters are identified, coordinates of the individual measure points relative to the distance meters can be determined. Because absolute coordinates of the first and second distance meters from a reference position are already known, absolute coordinates of the individual measure points from the reference position can be determined by adding the above-mentioned relative coordinates to the absolute coordinates of the distance meters.

Figure 6:
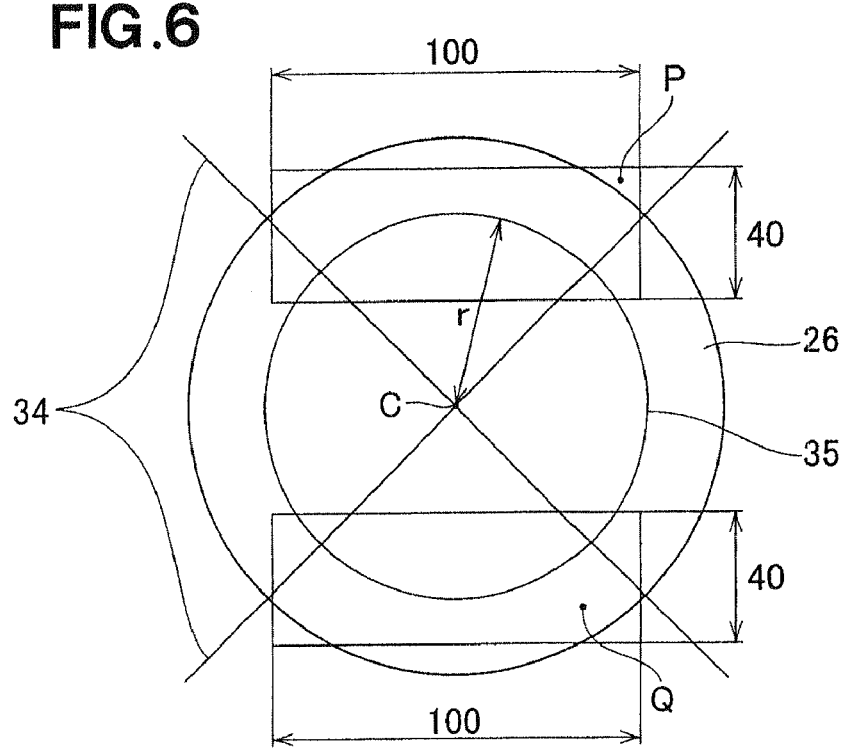
FIG. 6 is a diagram explanatory of positional relationship between the horizontally-elongated rectangular areas and the hub.

FIG. 6 is a diagram explanatory of positional relationship between the horizontally-elongated rectangular areas P and Q and the hub 26. In the illustrated example, the arithmetic operation/control device 33 may also function to not only specify or define the above-mentioned horizontally-elongated rectangular areas P and Q, but also imaginarily divide the front surface of the hub 26 into four equal parts, by use of perpendicularly-intersecting lines 34, so that a pitch circle of the hub bolts 27 is imaginarily divided into upper and lower and left and right divided pitch circle portions. Thus, the horizontally-elongated rectangular area P includes the upper divided pitch circle portion, and the horizontally-elongated rectangular area Q includes the lower divided pitch circle portion.

In the illustrated example of FIG. 6, each of the rectangular areas P and Q has two long sides each having a length of 100 mm, and two short sides each having a length of 40 mm. Distance r from the center C of the hub 26 is, for example, 57 mm. If the number of the hub bolts 27 provided on the hub 26 is four, one hub bolt 27 is included within each of the rectangular areas P and Q.

In case two hub bolts 27 are included within the rectangular area P, areas of the respective end surfaces of the two hub bolts 27 are determined, and one of the two hub bolts 27 having the greater end surface area is selected, so that it can be assumed that only one hub bolt 27 is included within the rectangular area P. Similarly, in case two hub bolts 27 are included within the rectangular area Q, areas of the respective end surfaces of the two hub bolts 27 are determined, and one of the two hub bolts 27 having the greater end surface area is selected, so that it can be assumed that only one hub bolt 27 is included within the rectangular area Q.

Figure 7:
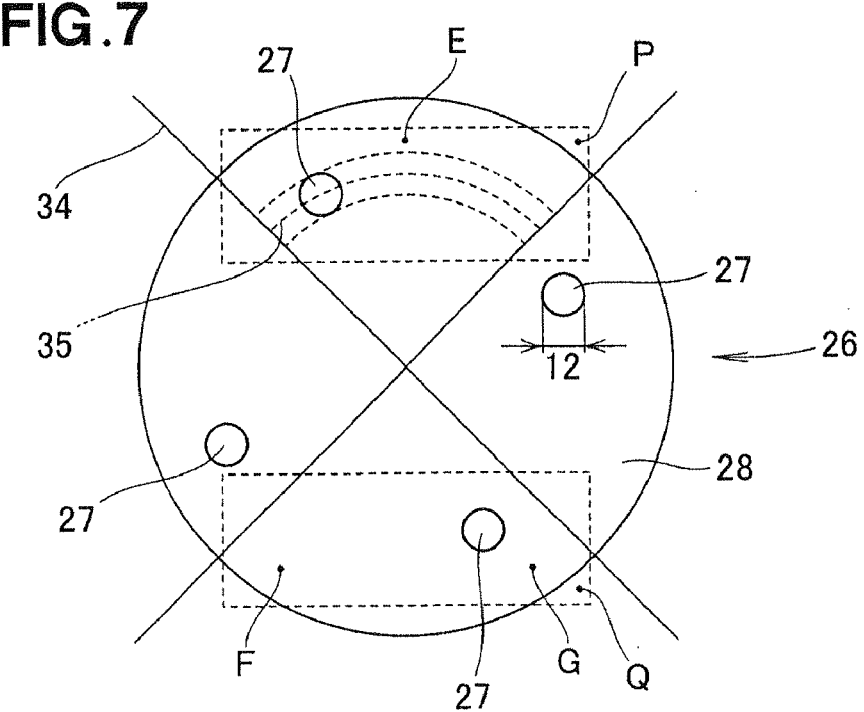
FIG. 7 is a diagram explanatory of how to calculate an inclination angle of the hub.

FIG. 7 is a diagram explanatory of how to calculate an inclination angle of the hub 26. First, a desired point E where no hub bolt 27 is located is extracted from the area P, and desired points F and G where no hub bolt 27 is located are extracted from the area Q. Then, coordinates of apexes of an imaginary triangle defined by the extracted points E, F and G, i.e. coordinates of the three points E, F and G, are acquired, so that an inclination angle $\phi$ of the hub 26 relative to the vertical plane extending along the vehicle conveyance line 12 can be calculated on the basis of the coordinates of the three points E, F and G.

Figure 8A:
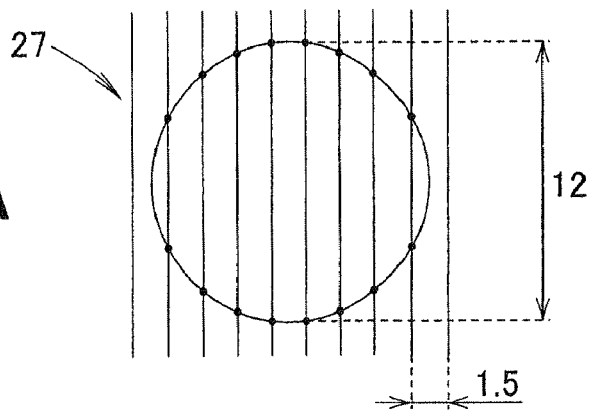
FIGS. 8A and 8B are diagrams explanatory of how to calculate center coordinates of a hub bolt.
Figure 8B:
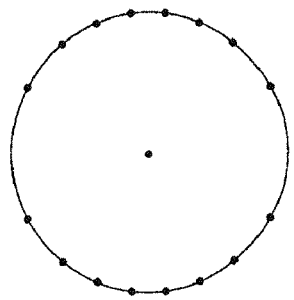

FIGS. 8A and 8B are diagrams explanatory of how to calculate center coordinates of each of the hub bolts 27. As illustrated in FIG. 8A, the diameter of the hub bolt 27 is, for example, 12 mm and the interval between every two adjoining ones of the measure lines is, for example, 1.5 mm, and thus, coordinates on the circumference of the hub bolt 27 can be imaginarily divided by eight lines via the arithmetic operation/control device 33. Thus, particular points (sixteen points in this case) where the distance measured by the corresponding distance meter suddenly varies (i.e., decreases) as compared to other points surrounding the particular points are detected. In this way, an outer circle of the hub bolt 27 is determined on the basis of coordinates of the sixteen particular points, and the center coordinates of the hub bolt 27 is calculated on the basis of the thus-determined outer circle.

Figure 9:
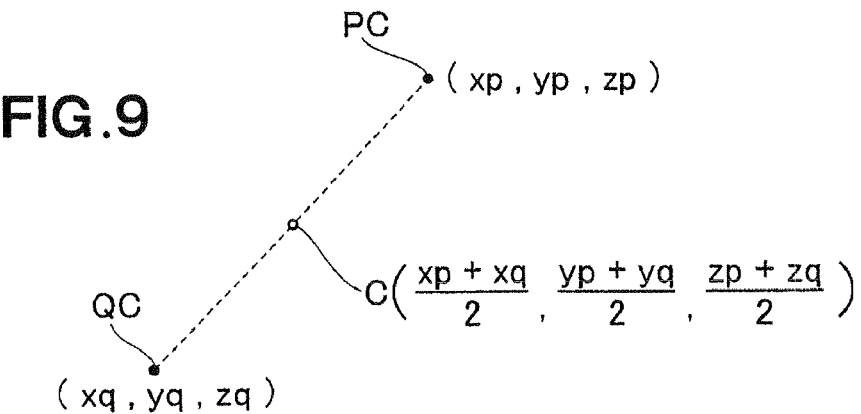
FIG. 9 is a diagram explanatory of how to calculate center coordinates of the hub.

FIG. 9 is a diagram explanatory of how to calculate center coordinates of the hub 26. In FIG. 9, a point PC represents center coordinates (xp, yp, zp) of the hub bolt 27 included within the area P, and a point QC represents center coordinates (xq, yq, zq) of the hub bolt 27 included within the area Q. If the number of the hub bolts 27 provided on the hub 26 are four, the center coordinates of the hub 26 is located at the middle between the points PC and QC, and thus, the center coordinates C of the hub 26 is calculated by ((xp+xq)/2, (yp+yq)/2, (zp+zq)/2).

Figure 10:
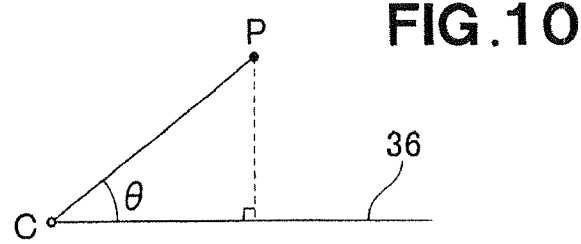
FIG. 10 is a diagram explanatory of how to calculate an orientation of the hub bolt.

FIG. 10 is a diagram explanatory of how to calculate an orientation of each of the hub bolts 27, where reference numeral 36 indicates a horizontal line passing the center coordinates of the hub 26. Relationship "tan $\theta$=(yp−yq)/(xp−xq)" is established from the center coordinates PC of the hub bolt 27 located within the area P and the center coordinates C of the hub 26, and an orientation (azimuth angle) $\theta$ of the hub bolt 27 is calculated from the relationship.

Figure 11:
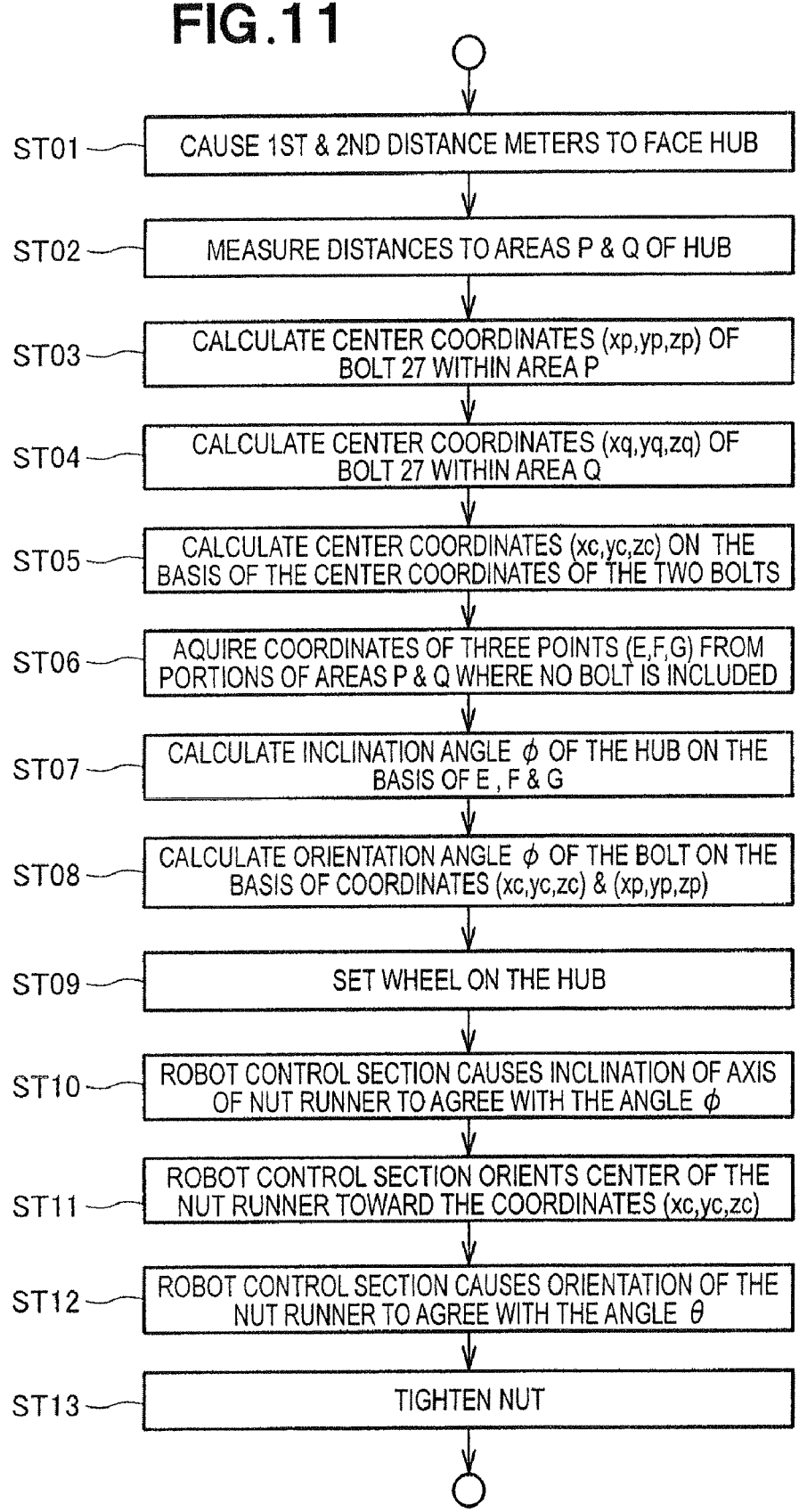
FIG. 11 is a flow chart showing a hub-posture-detecting operational sequence performed by the hub posture detection apparatus of the invention.

FIG. 11 is a flow chart showing a hub-posture-detecting operational sequence performed by the hub posture detection apparatus 10. First, at step ST01, the distance meters 31 and 32 are moved by the robot 13 of FIG. 1 to face the hub 26. Then, at step ST02, the distance meters 31 and 32 measure distances to the corresponding areas P and Q of the hub 26 in the manner as described above in relation to FIG. 4. Then, at step ST03, the center coordinates PC (xp, yp, zp) of the hub bolt 27 included within the area P is calculated in the manner as described above in relation to in FIG. 8, and, at step ST04, the center coordinates QC (xq, yq, zq) of the hub bolt 27 included within the area Q is calculated in the manner as described above in relation to in FIG. 8. Further, at step ST05, the center coordinates (xc, yc, zc) of the hub 26 is calculated on the basis of the center coordinates PC and QC of the two hub bolts 27 in the manner as described above in relation to FIG. 9.

Then, at step ST06, coordinates of the three points E, F and G are acquired in the manner as described above in relation to FIG. 7, i.e. from portions of the areas P and Q where no hub bolt 27 is included. At next step ST07, an inclination angle φ of the hub 26 is calculated on the basis of the acquired coordinates of the three points E, F and G in the manner as described above in relation to FIG. 7. Then, at step ST08, an orientation or azimuth angle θ of the bolt 27 on the planar surface of the hub 26 is calculated, on the basis of the center coordinates (xc, yc, zc) of the hub 26 and center coordinates PC (xp, yp, zp) of the hub bolt 27 located with the area P, in the manner as described above in relation to FIG. 10.

At next step ST09, a wheel is supplied and set on the hub 26 by means of the wheel supply apparatus 20 of FIG. 1. Then, the robot control section 17 of FIG. 1 causes the inclination of the axis of the nut runner 24 to agree with the inclination angle φ of the hub 26 at step ST10, and orients the center of the nut runner 24 toward the center coordinates (xc, yc, zc) of the hub 26 at step ST11. The robot control section 17 causes the orientation of the nut runner 24 to agree with the orientation or azimuth angle θ of the bolt 27 at step ST12, and the nut runner 24 tightens the nut onto the bolt 27 at step ST13.

The embodiment of the hub posture detection apparatus 10 has been described above in relation to the case where four hub bolts 27 are provided on one hub surface. The following paragraphs describe a modification where five hub bolts 27 are provided on one hub surface.

Figure 12:
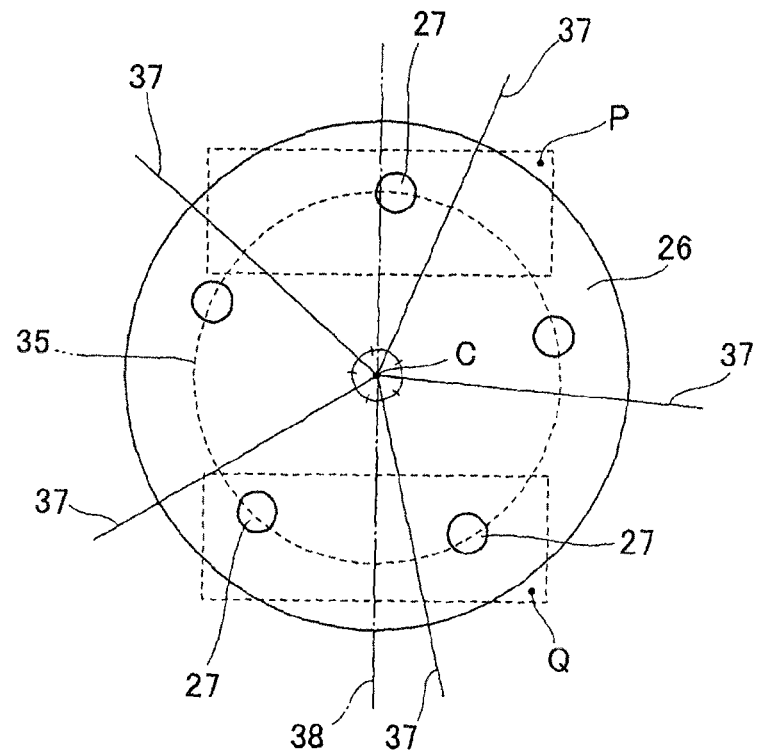
FIG. 12 is a diagram showing a modification where five hub bolts are provided on a hub surface and explanatory of relationship between the rectangular areas and the hub bolts.
Figure 13:
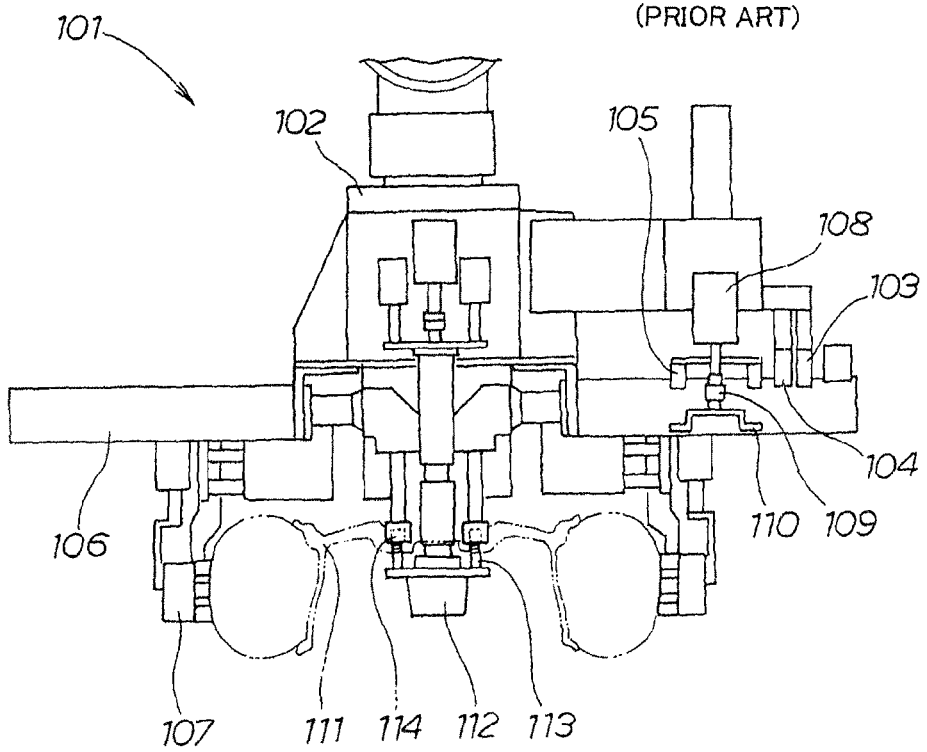
FIG. 13 is a view explanatory of a fundamental construction of a conventionally-known wheel mounting apparatus.

FIG. 12 is a diagram explanatory of the modification where five hub bolts 27 are provided on the hub surface and where two of the hub bolts 27 are included within one of the areas (area Q in the illustrated example of FIG. 12). The front surface of the hub 26 is imaginarily divided by lines 37 into five equal parts, so as to divide a pitch circle 35 of the five hub bolts 27 into five equally divided pitch circle portions. Thus, a horizontally-elongated rectangular area P including the upper divided pitch circle portion and a horizontally-elongated rectangular area Q including the lower divided pitch circle portion are specified or defined.

In the illustrated example of FIG. 12, two of the five hub bolts 27 are included in one of the areas P and Q (area Q in the illustrated example), and the five hub bolts 27 are angularly spaced from one another at 72° intervals. One of the two hub bolts 27 whose center is located closer to an area centerline 38, i.e. the right hub bolt 27 within the area Q, is selected. Then, center coordinates and inclination angle of the hub 26 and orientations of the five hub bolts 27 are calculated on the basis of center coordinates of the selected hub bolt 27 included within the area Q and hub bolt 27 included within the area P and with the 72° intervals taken into account.

Whereas the technique for detecting an inclination and center of a hub and orientations of hub bolts according to the present invention has been described as applied to a hub of a vehicle, it may be applied to any other types of industrial products as long as it detects an inclination of a component-part mounting surface and positions and orientations of stud bolts or mounting holes in a mounting section.

The above-described technique for detecting an inclination and center of a hub and orientations of hub bolts according to the present invention is well suited for mounting of a wheel on a vehicle.

Obviously, various minor changes and modifications of the present invention are possible in light of the above teaching. It is therefore to be understood that within the scope of the appended claims the invention may be practiced otherwise than as specifically described.

What is claimed is:

1. A hub posture detection method for, prior to mounting of a wheel on a hub of a vehicle conveyed along a vehicle conveyance line, detecting an inclination and center of the hub and orientations of hub bolts, comprising the steps of:

imaginarily dividing a front surface of the hub into four equal parts, by use of perpendicularly-intersecting lines, to divide a pitch circle of the hub bolts into upper and lower and left and right divided pitch circle portions and specify a first horizontally-elongated rectangular area including the upper divided pitch circle portion and a second horizontally-elongated rectangular area including the lower divided pitch circle portion;

measuring distances from a reference position to the first and second horizontally-elongated rectangular areas;

calculating, on the basis of the distances measured by the measuring step, coordinates of respective centers of two of the hub bolts included within the first and second horizontally-elongated rectangular areas;

calculating center coordinates of the hub on the basis of the coordinates of the centers of the two hub bolts;

acquiring, from portions of the first and second horizontally-elongated rectangular areas where no hub bolt is included, coordinates of three points that define apexes of an imaginary triangle;

calculating, on the basis of the coordinates of the three points, an inclination angle of the hub relative to a vertical plane extending along the vehicle conveyance line; and calculating an orientation of each of the hub bolts on the basis of the center coordinates of the hub and the coordinates of the center of the hub bolt.

2. A hub posture detection apparatus for, prior to mounting of a wheel on a hub of a vehicle conveyed along a vehicle conveyance line, detecting an inclination and center of the hub and orientations of hub bolts, comprising:

a control device that imaginarily divides a front surface of the hub into four equal parts, by use of perpendicularly-intersecting lines, to divide a pitch circle of the hub bolts into upper and lower and left and right divided pitch circle portions and specify a first horizontally-elongated rectangular area including the upper divided pitch circle portion and a second horizontally-elongated rectangular area including the lower divided pitch circle portion; and first and second distance meters, the first distance meter measuring a distance from a predetermined reference position to the first horizontally-elongated rectangular area, the second distance meter for measuring a distance from the predetermined reference position to the second horizontally-elongated rectangular area, the control device being adapted to:

calculate, on the basis of the distances measured by the first and second distance meters, coordinates of respective centers of two of the hub bolts included within the first and second horizontally-elongated rectangular areas;

calculate center coordinates of the hub on the basis of the coordinates of the centers of the two hub bolts;

acquire, from portions of the first and second horizontally-elongated rectangular areas where no hub bolt is included, coordinates of three points that define apexes of an imaginary triangle;

calculate, on the basis of the coordinates of the three points, an inclination angle of the hub relative to a vertical plane extending along the vehicle conveyance line; and calculate an orientation of each of the hub bolts on the basis of the center coordinates of the hub and the coordinates of the center of the hub bolt.

* * * * *